April 11, 1961  C. R. SPERRY ET AL  2,978,770
FLUID-TIGHT FASTENER AND CLOSURE
Filed Dec. 9, 1958  3 Sheets-Sheet 1

INVENTORS
CHARLES R. SPERRY
CARLETON S. MARDEN
BY
Brumbaugh, Free, Graves & Donohue
THEIR ATTORNEYS April 11, 1961  C. R. SPERRY ET AL  2,978,770
FLUID-TIGHT FASTENER AND CLOSURE
Filed Dec. 9, 1958  3 Sheets-Sheet 2

INVENTORS
CHARLES R. SPERRY
CARLETON S. MARDEN
BY
THEIR ATTORNEYS

April 11, 1961   C. R. SPERRY ET AL   2,978,770
FLUID-TIGHT FASTENER AND CLOSURE
Filed Dec. 9, 1958   3 Sheets-Sheet 3

INVENTORS
CHARLES R. SPERRY
CARLETON S. MARDEN
BY
THEIR ATTORNEYS

United States Patent Office 2,978,770
Patented Apr. 11, 1961

2,978,770

FLUID-TIGHT FASTENER AND CLOSURE

Charles R. Sperry, Cambridge, and Carleton S. Marden, Boston, Mass., assignors to Arthur D. Little, Inc., Cambridge, Mass., a corporation of Massachusetts Filed Dec. 9, 1958, Ser. No. 779,252

11 Claims. (Cl. 24—203)

This invention relates to improvements in fastening devices, and it relates particularly to a quick operating, flexible fastening device by means of which an opening in an article, such as, for example, a diving or space suit, a container for fluids under pressure and the like, can be opened and closed and sealed.

Despite the demand for a flexible, fluid-tight fastening and closure device suitable for use in flexible articles, no completely satisfactory type of fastener for this purpose has been provided heretofore. The majority of the devices now in use include hatches or covers provided with sealing rings, gaskets or packings, or extended sleeve portions which must be twisted and then lashed in order to prevent leakage therethrough.

The present invention provides a light, flexible, quick-opening fastener and closure which is completely fluid tight when closed and thus highly suitable for use in conjunction with flexible articles which are subjected to high and unequal pressures normally promoting leakage therein.

More particularly, in accordance with the present invention, a suitable form of fastener closure includes a pair of fastening members of loop-like or convoluted form, such as helical wire or plastic coils, which are disposed along the opposed edges of an internal opening or slit in a piece of flexible material forming a part of a wall of an article adapted to receive or be subjected to a fluid under pressure. The loops of the fastening members are embedded in a thickened channel-like rib which may be integral with or bonded to the article along the edges of the slit and provided with parallel flanges or lips disposed on opposite sides of and extending generally parallel with the fastening members so that the lips on the rib on one edge of the opening will engage the lips on the rib on the other edge when the fastening members are connected. The fastener includes an elongated, flexible shaft which is movable lengthwise of the slot or slit in the article to engage in and retain the loops of the fastening elements in overlapping, interposed relation thereby to close the slit or opening. Appropriate sealing means is provided either for preventing leakage along the passage through which the flexible shaft extends or through an appropriate mechanism for moving the shaft lengthwise of the fastening members to connect and disconnect them.

The arrangement of the sealing lips or flanges on opposite sides of the fastening members is such that twisting or tension stresses exerted on the fastener when it is closed cannot disengage both pairs of lips simultaneously thereby preventing leakage therebetween.

For a better understanding of the present invention, reference may be had to the accompanying drawings in which.

Figure 1:
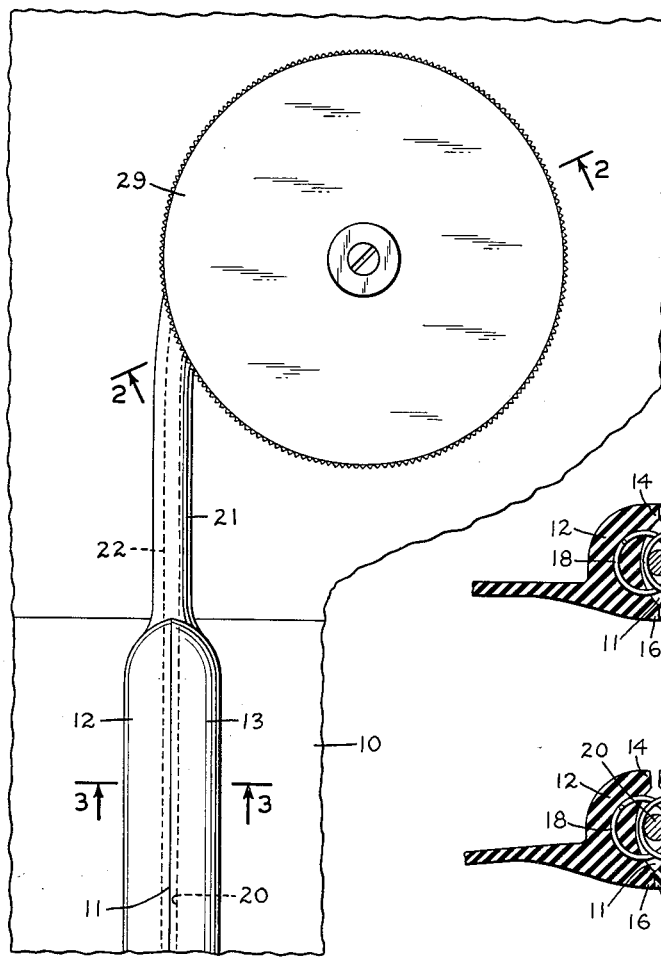
Figure 1 is a plan view of a portion of a typical fastener embodying the present invention.

The forms of the invention illustrated in the drawings are useful as closures for access openings or slits in a diving suit, pressurized suit, a flexible container for gas or liquid under pressure and the like, formed of impermeable material such as natural of synthetic rubber, rubberized fabric or the like.

Figure 3:
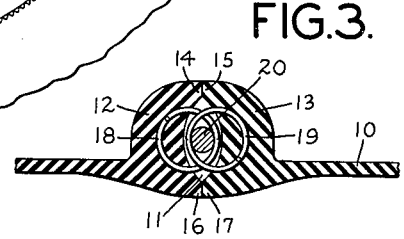
Figure 3 is a view in cross section taken on line 3—3 of Figure 1.
Figure 4:
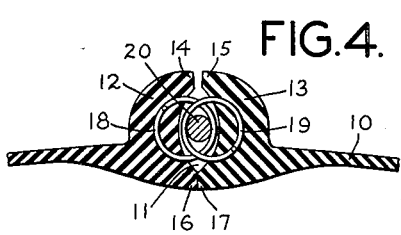
Figure 4 is a view in cross section through the fastener showing the position of the elements when the fastener is subjected to twisting or bending stresses.
Figure 2:
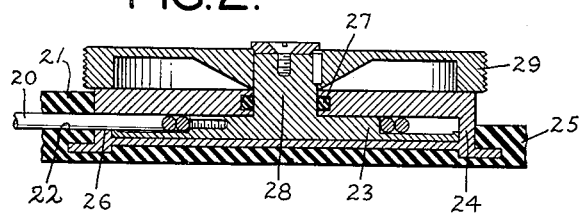
Figure 2 is a view in cross section taken on line 2—2 of Figure 1.

As shown in Figure 1, the impermeable material 10 is provided with an opening, slot or slit 11. Extending along the edges of the slit are thickened and generally channel-like ribs 12 and 13 providing laterally extending, substantially parallel lips or flanges 14, 15, 16 and 17 which are in edge-to-edge engagement when the slit is closed thereby to seal the slit against the passage of fluid from one side of the fabric or material 10 to the other. Mounted or molded in the thickened channel-like ribs 12 and 13 are a pair of fastening elements 18 and 19 which are illustrated as being generally helical coils of wire or the like. However, the fastening elements can be a series of aligned, spaced-apart loops or convolutions which are embedded in and bonded to the ribs 12 and 13. As illustrated, the loops or convolutions of the fastening elements 18 and 19 are not intended to lock together. They overlap when the slit 11 is closed as shown in Figure 3. In order to maintain them in the closed position, an elongated flexible shaft 20 formed of wire or cable can be inserted through the overlapping portion of the loops or coils by endwise movement along the slit 11. Due to the transverse rigidity of the coils and the shaft, even great transverse stresses exerted at right angles to the slit 11 will not pull both pairs of lips 14, 15 and 16, 17 apart. Such stresses may tend to bend the ribs or rock them around the shaft with the result that the lips 14 and 15 may be separated, but the lips 16 and 17 at the same time are compressed together more tightly so that leakage therebetween is avoided, as shown in Figure 4.

Leakage at opposite ends of the channel-like ribs 12 and 13 is avoided by vulcanizing or otherwise joining them at their ends. At one end, the elements 12 and 13 merge into a hollow rib 21 provided with a passage 22 through which the shaft 20 extends and is moved. In order to project and retract the shaft 20, it is mounted on a drum 23 which is rotatably mounted inside a casing 24 molded into a thickened portion 25 of the material 10. The shaft 20 extends through a passage 26 in the casing 24 and can be wound and unwound by rotation of the drum. Inasmuch as liquid may leak along the passage 22 into the casing 24, an O-ring or similar seal 27 is provided to seal the opening in the top of the housing 24 through which extends a shaft 28 connecting the drum 23 and a knurled operating wheel 29 for rotating the drum.

Figure 5:
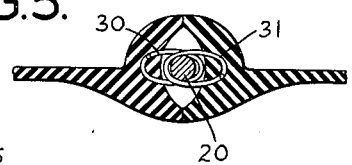
Figures 5, 6 and 7 are cross-sectional views of modified forms of fasteners illustrating different coil or loop formations suitable for use in the fastener.

Fastening and closure devices of the type described are susceptible to considerable modification. For example, the shape of the convolutions or loops of the fastening members may be modified widely. Thus, as shown in Figure 5, each of the fastener loops 30 and 31 may be oval rather than circular.

Figure 6:
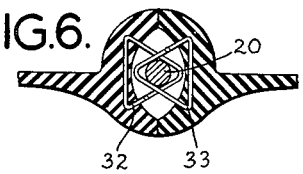
Figure 7:
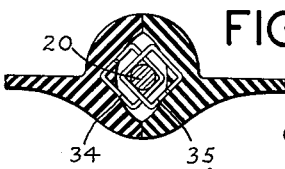

As shown in Figure 6, the coils or loops 32 and 33 may be triangular or, as shown in Figure 7, the coils or loops 34 and 35 may be square or diamond shaped.

Figure 8:
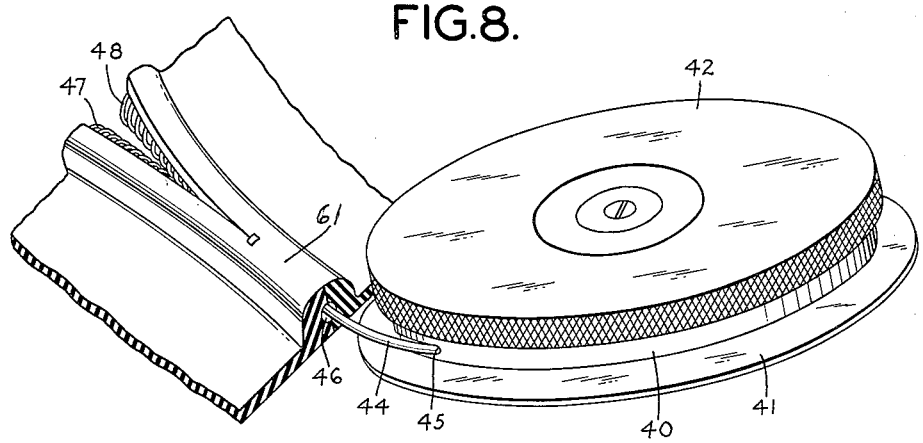
Figure 8 is a perspective and partial sectional view of a modified type of mechanism for advancing and retracting the flexible locking shaft for engaging and connecting the fastening loops.
Figure 9:
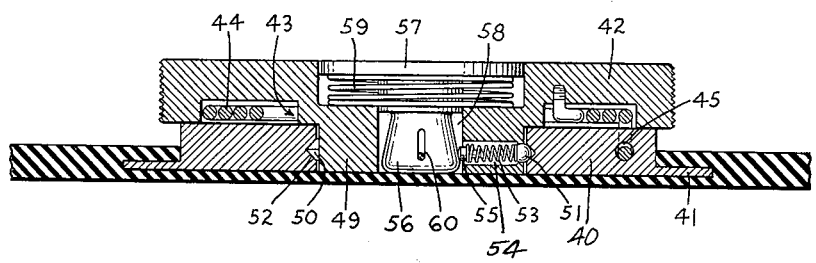
Figure 9 is a view in cross section through the mechanism of Figure 8.
Figure 10:
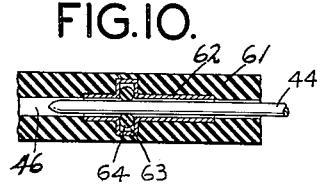
Figure 10 is a view in section of a device for preventing leakage along the flexible locking shaft.

The mechanism for projecting and retracting the connecting rod or shaft is also susceptible to considerable modification, as shown in Figures 8, 9 and 10. Thus, the actuating mechanism may include a disc-like base plate 40 provided with a base flange 41 which is molded in the article having the opening therein. Mounted on top of the base plate 40 is a knurled operating wheel 42 provided with an annular recess 43 in its undersurface in which the connecting shaft 44 is wound and housed. The free end of the shaft 44 extends downwardly through a passage 45 in the supporting disc 40 and out through a passage 46 in a rib molded in the flexible material for co-operation with the fastening elements 47 and 48, as described above. The knurled operating wheel 42 has a hub 49 which extends into an opening 50 in the plate 40. A spring-pressed ball 51 carried by the hub 49 engages in a peripheral groove 52 around the opening 50 and thus holds these elements together with capacity for separation thereof. A spring 53 in a radial bore 54 on the hub 49 urges the ball 51 into the groove 52 and urges a plug 55 at its opposite end against a tapered shank 56 on a push-button 57 which is carried in a central recess and bore 58 in the operating wheel 42. A spring 59 normally biases the push-button 57 upwardly but the push-button is limited in its upward movement by a pin and slot connection 60 between the button and the hub 49. Inward pressure on the push-button 57 will allow the spring 53 to expand and permit the ball 51 to be disengaged from the groove 52 thereby allowing the knob or operating wheel to be lifted off to gain access to the shaft 44. The button 57 acts as a safety release so that the shaft can be withdrawn quickly to release the fastening members 47 and 48 in an emergency.

Leakage from the fastening element into the operating mechanism is avoided by providing the passage 46 in the rib 61 with a gasket or seal which engages the shaft 44 in sliding relation thereto. As best shown in Figure 10, the passage 46 has a tubular member 62 therein provided with a circumferential groove 63 in which an O-ring 64 is mounted for engagement with the shaft 44 to prevent fluid under pressure from leaking along the operating shaft and escaping from one side of the material to the other.

Figure 11:
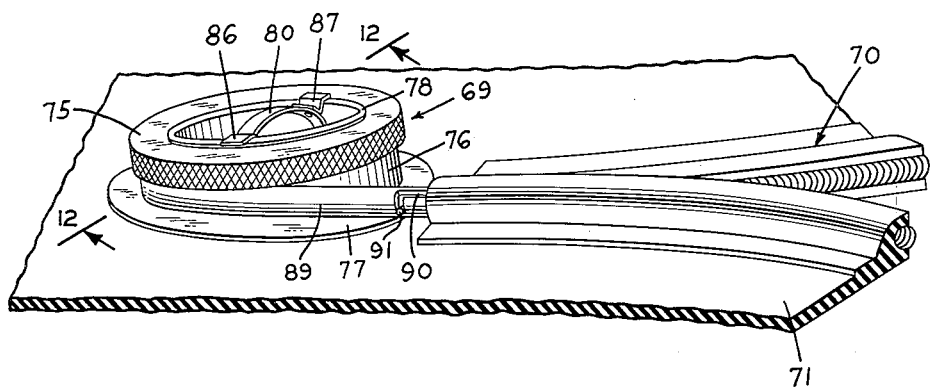
Figure 11 is a perspective view of another form of mechanism for advancing and retracting the flexible locking shaft.
Figure 12:
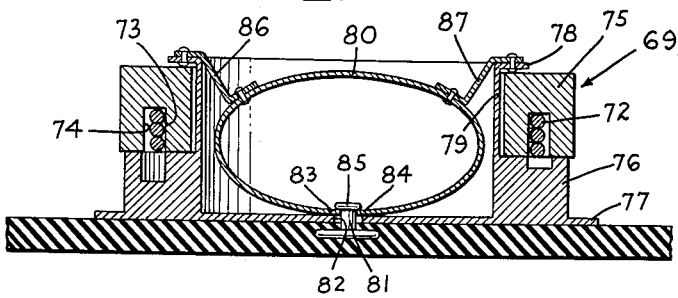
Figure 12 is a view in cross section taken on line 12—12 of Figure 11.
Figure 13:
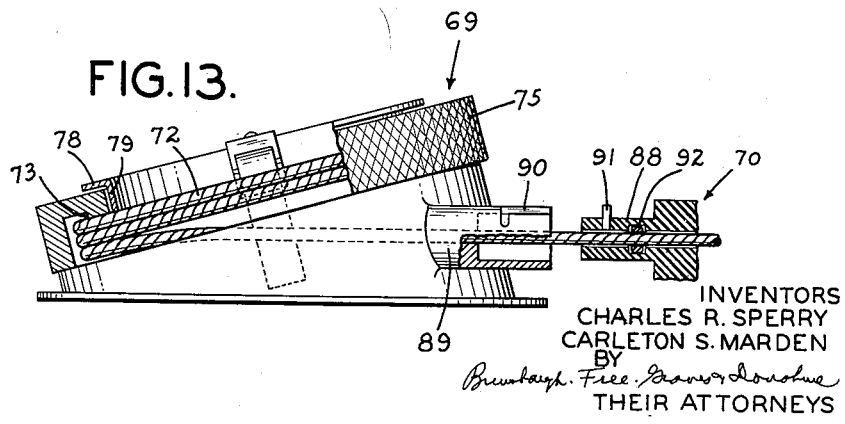
Figure 13 is a side elevational and partial sectional view of the mechanism disclosed in Figures 11 and 12.

Another form of mechanism 69 for advancing and retracting the flexible shaft for a fastener of the type described generally above and having a quick release safety feature is illustrated in Figures 11 to 13. The fastening device 70 for the garment or other article 71 is the same as those disclosed in Figures 3 to 7, and the coils of the fastener 70 may be connected by means of the flexible shaft 72 shown in Figures 12 and 13. The flexible shaft 72 is wound around a cylindrical surface 73 forming one wall of a groove 74 in the underside of a knurled ring or drum 75 which is rotatably mounted on a housing or base member 76 having a flange 77 thereon engageable with the surface of the article 71. A radially extending flange 78 at the upper end of a tubular extension 79 on the base member retains the drum 75 on the base member 76.

As best shown in Figure 12, the mechanism 69 is detachably mounted on the article 71 by means of a spring 80 which releasably engages a headed pin 81 fixed to the member 71 and projecting through an opening 82 in the bottom of the base member. The spring 80 is generally of oval shape and has spaced-apart free ends 83 and 84 which are adapted to engage opposite sides of the pin beneath the head 85 thereon so that the base and drum are detachably secured to the member 71. Projecting upwardly and outwardly from the spring 80 are a pair of arms 86 and 87 which bear against the upper edge of the flange at diametrically spaced points and form fulcrums which enable the free ends 83 and 84 of the spring to be spread apart when pressure is applied to the portion of the spring 80 between the arms 86 and 87. Thus, by pressing the spring 80 and pulling out on the drum 75, the mechanism 69 can be lifted off of the pin 81. By twisting the mechanism 69, it can be detached from the tubular extension 88 (Figure 13) on the fastening member 70 through which the cable 72 moves to close and release the fastener 70. As shown in Figures 11 and 13, the base member 76 has a generally tangentially arranged sleeve 89 telescopically engageable with the extension 88 to enable the cable to be projected from the drum into the fastener 70 and retracted therefrom. A bayonet slot 90 is formed in the sleeve 89 for receiving a pin 91 on the extension 88 to enable the mechanism 69 to be locked to the fastener 70.

It will be understood that by rotating the drum 75, the cable 72 can be wound or unwound and projected into or withdrawn from the fastening element 70. Moreover, by pressing on the spring 80 and lifting up on the drum 75 and then giving the assembly 69 a quick twist, it can be disconnected from the fastener and the cable withdrawn from the fastener to release it almost instantaneously if for any reason it should be necessary to do so.

In order to prevent leakage through the tubular member 88, it may be provided with an O-ring seal 92 engaging the cable 72 when the latter is in position to secure the fastener 70 in its closed position.

It will be apparent from the preceding description of typical fasteners embodying the present invention that they are susceptible to further modification without departing from the invention and, therefore, the forms of the fastener shown herein should be considered as illustrative.

We claim:

1. A fluid-tight fastener comprising a piece of impermeable material having opposed internal edges defining an opening therein, channel-like ribs on said edges, each rib having spaced apart lips extending lengthwise of said edges, the ends of said ribs being united at opposite ends of said opening, a passage in said material communicating with said opening at one end thereof, a flexible shaft slidable in said passage and movable lengthwise of said opening, means mounted on said piece of material for moving said shaft, a fastener member including a plurality of substantially coaxial loops secured to each rib between said lips thereof, the loops being movable into interposed, overlapping relation to receive said shaft to connect said fastener members, the lips on one rib being in opposed fluid-tight, edge-to-edge engagement with the lips on the other rib when the fastener members are connected, and sealing means for preventing leakage of fluid from one side of said piece of material to the other along said shaft and said means for moving it.

2. The fastener set forth in claim 1 in which said sealing means comprises a sealing ring in said piece of material extending around said passage and engaging said shaft.

3. The fastener set forth in claim 1 in which said means for moving said shaft comprises a drum mounted on said piece of material for rotation relative thereto and connected to one end of said shaft, and means connected with said drum to rotate it to wind said shaft on said drum and unwind it therefrom.

4. A fluid-tight fastener comprising a piece of fluid-tight material having opposed edges defining an opening therein, flexible ribs extending along said edges, each rib having substantially parallel, resilient lips and a base portion between said lips, a coil-like fastening member including a plurality of convolutions extending along and secured to each base portion between the lips of said rib thereof, said coil-like fastening members being movable to a closed position in which portions of the convolutions of one fastening member are interposed between portions of the convolutions of the other fastening member and the lips on one rib engage the lips on the other rib in edge-to-edge relation, an elongated flexible shaft slidably mounted in said material and movable lengthwise of said fastening members through the interposed portions of said convolutions to releasably connect said fastening members and press said lips on one rib into edge-to-edge engagement with the lips on the opposing rib and sealing means engaging said shaft for preventing leakage of fluid along said shaft from one side of said material to the other.

5. A fluid-tight fastener comprising a flexible, fluid-tight article having internal, opposed edges defining an opening therein, a fastening member secured to said article along each of said opposed edges, each fastening member having a plurality of loops and the loops of the fastening member on one edge being movable into interposed overlapping relation to the loops of the other fastening member to close said opening, an elongated flexible locking member movable lengthwise of said opening in one direction to engage in the overlapping loops of said fastening members to lock them together, said locking member being movable in the opposite direction to release said fastening members from each other, said article having a passage receiving said locking member slidably, means on said article for moving said locking member, sealing means operatively associated with said locking member for preventing leakage of fluid from one side of the article to the other along said locking member and said means for moving said locking member, and sealing lips extending along the edges of said opening on opposite sides of said fastening members, said lips on one edge opposing the lips on the other edge and being in fluid-tight, edge-to-edge engagement when said fastening members are connected.

6. The fastener set forth in claim 5 in which said means for moving said locking member comprises a drum on which said locking member is wound, and a housing mounted on said article and enclosing said drum.

7. The fastener set forth in claim 6 in which said sealing means comprises a fluid-tight connection between said housing and said drum.

8. The fastener set forth in claim 5 in which said sealing means comprises a sealing ring mounted in said article circumferentially of said passage and in sliding, fluid-tight engagement with said locking member.

9. The fastener set forth in claim 5 in which said means for moving said locking member comprises a drum on which said locking member is wound and a housing detachably mounted on said article and supporting said drum from rotation relative thereto.

10. The fastener set forth in claim 5 in which said means for moving said locking member comprises a housing, a member projecting from said article, means on said housing detachably engaging said member for detachably connecting said housing to said article, and a drum rotatably mounted on said housing and connected to said locking member for winding the latter thereon and unwinding the locking member therefrom upon rotation of said drum relative to said housing.

11. A fluid-tight fastener comprising a piece of impermeable material having opposed substantially parallel edges thereon defining an opening in said material, a fastening member including a row of loop-like fastening elements secured to each of said edges, a flexible shaft slidably mounted in said piece of material and movable lengthwise of said opening to pass through said loop-like fastening elements and thereby connect said fastening members, means including pairs of lips on each of said edges and on opposite sides of said fastening members for sealing said opening when said fastening members are connected, and sealing means operatively associated with said shaft and mounted on said piece of material for maintaining said shaft and piece of material in fluid-tight relation and preventing leakage of fluid along said shaft from one side of said piece of material to the other.

References Cited in the file of this patent

UNITED STATES PATENTS

| | | |
|---|---|---|
| 2,910,755 | Hansen | Nov. 3, 1959 |

FOREIGN PATENTS

| | | |
|---|---|---|
| 20,330 | Denmark | July 12, 1915 |
| 107,646 | Sweden | June 15, 1943 |
| 741,033 | Germany | Nov. 3, 1943 |
| 959,390 | France | Mar. 28, 1950 |